US007951283B2

(12) United States Patent
Stoots et al.

(10) Patent No.: US 7,951,283 B2
(45) Date of Patent: May 31, 2011

(54) HIGH TEMPERATURE ELECTROLYSIS FOR SYNGAS PRODUCTION

(75) Inventors: Carl M. Stoots, Idaho Falls, ID (US); James E. O'Brien, Idaho Falls, ID (US); James Stephen Herring, Idaho Falls, ID (US); Paul A. Lessing, Idaho Falls, ID (US); Grant L. Hawkes, Sugar City, ID (US); Joseph J. Hartvigsen, Kaysville, UT (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 275 days.

(21) Appl. No.: 11/461,337

(22) Filed: Jul. 31, 2006

(65) Prior Publication Data
US 2008/0023338 A1 Jan. 31, 2008

(51) Int. Cl.
*C25B 1/04* (2006.01)
(52) U.S. Cl. ........................ 205/637; 205/628
(58) Field of Classification Search .................. 205/637, 205/628
See application file for complete search history.

(56) References Cited

U.S. PATENT DOCUMENTS

| 4,690,690 A * | 9/1987 | Andrew et al. ............. 48/214 A |
| 5,492,777 A * | 2/1996 | Isenberg et al. .................. 429/17 |
| 2004/0112741 A1* | 6/2004 | Murdoch ....................... 204/265 |
| 2004/0124095 A1* | 7/2004 | Fujimura et al. .............. 205/629 |
| 2004/0202914 A1* | 10/2004 | Sridhar et al. .................. 429/34 |
| 2005/0232833 A1* | 10/2005 | Hardy et al. .................. 422/188 |
| 2008/0029388 A1* | 2/2008 | Elangovan et al. ........... 204/242 |

OTHER PUBLICATIONS http://www.hi2h2.com/publications_risoe.htm (current).*
Written Opinion of the International Searching Authority for PCT/US07/066053, mailed Feb. 12, 2009, 6 pages.
PCT International Search Report and Written Opinion of the International Searching Authority, International Application No. PCT/US07/66053, International Filing Date Apr. 5, 2007.
Jensen et al., "High temperature electrolysis of steam and carbon dioxide", in Energy technologies for Post Kyoto targets in the medium term. Proceedings. Risø international energy conference, Risø (DK), May 19-21, 2003. Sønderberg Petersen, L. ; Larsen, H. (eds.), Risø National Laboratory (DK). Systems Analysis Department; Risø National Laboratory (DK). Information Service Department. Risø-R-1405(EN) (2003) p. 204-215.
Jensen et al., "Ni/YSZ-electrode Passivation at Cathodic Current" to appear in Proceedings of the 26th Risø International Symposium on Material Science. S. Linderoth et al. (Eds.), Risø National Laboratory, Roskilde, Denmark, 2005.
Jensen et al., "Perspectives of High Temperature Electrolysis Using SOEC". Paper presented at 19th World Energy Congress 2004, Sydney (AU), Sep. 5-9, 2004. World Energy Council, 5th Floor, Regency House, 1-4 Warwick Street, London W1B 5LT, UK (2004).
Jensen et al., "The Potential of the Solid Oxide Electrolyser for the Production of Synthetic Fuels", paper presented at Hypothesis VI, Havana, Cuba (2005).

(Continued)

*Primary Examiner* — Alexa D. Neckel
*Assistant Examiner* — Nicholas A. Smith
(74) *Attorney, Agent, or Firm* — TraskBritt

(57) ABSTRACT

Syngas components hydrogen and carbon monoxide may be formed by the decomposition of carbon dioxide and water or steam by a solid-oxide electrolysis cell to form carbon monoxide and hydrogen, a portion of which may be reacted with carbon dioxide to form carbon monoxide. One or more of the components for the process, such as steam, energy, or electricity, may be provided using a nuclear power source.

22 Claims, 4 Drawing Sheets

OTHER PUBLICATIONS

O'Brien et al., Parametric Strudy of Large-Scale Production of Syngas Via High-Temperature Co-Electrolysis, International Journal of Hydrogen Energy, 2009;34:4216-4226.

O'Brien et al., High-Temperature Electrolysis for Large-Scale Hydrogen and Syngas Production from Nuclear Energy—Summary of System Simulation and Economic Analyses, International Journal of Hydrogen Energy (2009), 12 pages.

Utgikar et al., Life Cycle Assessment of High Temperature Electrolysis for Hydrogen Production via Nuclear Energy, International Jounal of Hydrogen Energy, vol. 31, 2006, pp. 939-944.

Written Opinion of the International Searching Authority for PCT/US07/066053, mailed Feb. 12, 2009, 6 pages.

Jensen et al., "High Temperature Electrolysis of Steam and Carbon Dioxide," Risø National Laboratory, Roskilde, Denmark, 21 pages, May 2003.

Jensen et al., "NI/YSZ-Electrode Passivation at Cathodic Current," Risø National Laboratory, Roskilde, Denmark, pp. 1-6, 2005.

Jensen et al., "Perspectives of High Temperature Electrolysis Using SOEC," Risø National Laboratory, Roskilde, Denmark, pp. 1-10, 2004.

Jensen et al., "The Potential of the Solid Oxide Electrolyser for the Production of Synthetic Fuels," Risø National Laboratory, Roskilde, Denmark, 7 pages, 2005.

* cited by examiner

HIGH TEMPERATURE ELECTROLYSIS FOR SYNGAS PRODUCTION

GOVERNMENT RIGHTS

This invention was made with government support under DE-AC07-05ID14517 awarded by the United States Department of Energy. The government has certain rights in the invention.

BACKGROUND OF THE INVENTION

Field of the Invention: Embodiments of the invention relate to the production of hydrogen ($H_2$) and carbon monoxide (CO) and in particular to the production of hydrogen and carbon monoxide from water or steam and carbon dioxide; the hydrogen and carbon monoxide may be used in fuel production.

State of the Art: Energy consumption in the United States and throughout the world continues to increase. As the demands for energy increase, additional methods for producing energy are developed. Concerns about the increased wastes and pollutants produced by many of the conventional energy production processes, and the low efficiencies of such processes, have led to further research for cleaner, safer, and more readily available energy sources.

In response to the increasing energy production requirements and the desire to reduce or eliminate pollutants from energy sources, new, cleaner, fuel sources are being sought. A known source of cleaner fuels includes synthetic fuels, or synfuels, made from synthesis gas, or syngas. The conversion of syngas into synfuels, using processes such as the Fischer-Tropsch process, is known and has been used throughout the world. In recent times, with the sustained prices for oil reaching over fifty dollars per barrel, the conversion of syngas into synfuels provides a viable economic alternative to the continued use of naturally occurring sources of oil and fuels produced from such sources. Further, synfuels may burn cleaner than natural oil and fuels produced therefrom.

Syngas comprises carbon monoxide (CO) and hydrogen ($H_2$). Syngas may be converted or refined to form synfuels such as methane. For example, carbon monoxide and hydrogen may be catalyzed in a Fischer-Tropsch process to convert the carbon monoxide and hydrogen into liquid hydrocarbons. The synfuels produced from the syngas may include high purity fuels having fewer pollutants than naturally occurring fuels or fuels processed from naturally occurring oil deposits.

The production of syngas is required for the production of synfuels. As the economic viability of producing synfuels from syngas improves, new sources of syngas and methods for producing syngas have been developed.

High temperature solid-oxide fuel cells may be used to produce electricity and water from hydrogen and oxygen. When run in reverse, the solid-oxide fuel cells act as solid-oxide electrolysis cells, which are able to electrolytically reduce and split water into hydrogen and oxygen. Thus, water may be converted into hydrogen, which may be combined with carbon monoxide to form a syngas. In a solid-oxide fuel cell the anode is the reducing gas electrode and the cathode is the oxidant-side electrode. When operated in reverse, as a solid-oxide electrolysis cell, the anode is the oxidant-side electrode and the cathode is the reducing electrode.

In some recent studies, it has been suggested that solid-oxide electrolysis cells may be used for high temperature electrolysis of water and carbon dioxide into hydrogen and carbon monoxide. Therefore, it would be beneficial to develop systems and methods for converting water and carbon dioxide into hydrogen and carbon monoxide for use in syngas and synfuels production processes.

SUMMARY OF THE INVENTION

According to embodiments of the invention, hydrogen ($H_2$) and carbon monoxide (CO) may be formed from water ($H_2O$) and carbon dioxide ($CO_2$) using a solid-oxide electrolysis cell to decompose the water to hydrogen and oxygen, to decompose carbon dioxide to carbon monoxide and oxygen, and to react carbon dioxide with at least some of the produced hydrogen to form water and carbon monoxide. The hydrogen and carbon monoxide produced according to embodiments of the invention may be used as syngas components for the production of synfuels according to conventional methods.

Solid-oxide electrolysis cells suitable for use with embodiments of the invention may include a porous cathode, a gas-tight electrolyte, and a porous anode. A power source for providing an electrical current across a solid-oxide electrolysis cell may also be incorporated with embodiments of the invention. The solid-oxide electrolysis cells used with particular embodiments of the invention may include any conventional solid-oxide electrolysis cell and any conventional materials used to form the cathodes, anodes, and electrolytes of such solid-oxide electrolysis cells.

In some embodiments of the invention, solid-oxide electrolysis cells may be grouped together to create one or more arrays of solid-oxide electrolysis cells. Water, such as water in the form of steam, may be fed to the arrays of solid-oxide electrolysis cells where the water comes into contact with a cathode side of the solid-oxide electrolysis cells. An electrical current in the cathode of a solid-oxide electrolysis cell facilitates the decomposition of water into hydrogen and oxygen ions ($O^{-2}$). Carbon dioxide ($CO_2$) may also be fed to the arrays of solid-oxide electrolysis cells, which may result in the decomposition of carbon dioxide into carbon monoxide (CO) and oxygen ions. The oxygen ions pass through an electrolyte to an anode of the solid-oxide electrolysis cell where the oxygen ions combine to form oxygen ($O_2$), releasing electrons. The oxygen may be collected as a product stream of the process. The hydrogen and carbon monoxide may not pass through the electrolyte and may be collected as a product stream of the process.

In other embodiments of the invention, carbon dioxide may be introduced to the cathode side of a solid-oxide electrolysis cell with water, or steam. The carbon dioxide may react with hydrogen formed by the decomposition of water on the cathode side of the solid-oxide electrolysis cell. Reaction of carbon dioxide with hydrogen forms water and carbon monoxide. The water may be further decomposed into hydrogen and oxygen according to embodiments of the invention. The carbon monoxide formed by the reaction of carbon dioxide with hydrogen may be collected as a product of the process.

According to embodiments of the invention, carbon monoxide and hydrogen collected from the decomposition of water, carbon dioxide, or a combination of water and carbon dioxide and the reaction of carbon dioxide with hydrogen may be collected, stored, or otherwise provided to a synfuels production process. As noted previously, syngas is comprised of carbon monoxide and hydrogen. The syngas components produced by embodiments of the invention may be used to form synfuels according to conventional methods.

According to particular embodiments of the invention, at least a portion of the feed streams, or at least a portion of the energy required to convert water and carbon dioxide to syngas components hydrogen and carbon monoxide, are provided by a nuclear power process or a process utilizing nuclear power to produce the desired feed streams or energy. In some embodiments, nuclear power may be used to generate steam, which may be used as a water source for the production of syngas by the solid-oxide electrolysis cells. Steam produced by the nuclear power process may also be used to heat the feed streams, the solid-oxide electrolysis cells, the product streams, or combinations thereof, to provide process temperatures above, for example, at least about 500° C. Electricity produced by the nuclear power process may also be used to provide heat to particular portions of the process or to provide electrical current required for operation of the solid-oxide electrolysis cells. Electricity and steam generated by the nuclear process may also be used to promote a combustion process for the formation of carbon dioxide, such as by the combustion of fuels, wastes, or other products. The produced carbon dioxide may then be used as a feed source for embodiments of the invention.

In still other embodiments of the invention, carbon dioxide may be provided to a solid-oxide electrolysis cell from a carbon dioxide source. For example, stored carbon dioxide, in liquid, solid, or gaseous form, may be used as a carbon dioxide source. Carbon dioxide produced by combustion processes, such as by the burning of fuels, wastes, or other materials, by biological reduction processes, or by manufacturing processes, such as by the production of cement clinker, or petrochemical refining processes, wherein carbon dioxide may be extracted from crude oil, may also be used with embodiments of the invention.

BRIEF DESCRIPTION OF THE DRAWINGS

While the specification concludes with claims particularly pointing out and distinctly claiming that which is regarded as the present invention, this invention can be more readily understood and appreciated by one of ordinary skill in the art from the following description of the invention when read in conjunction with the accompanying drawings in which:

DETAILED DESCRIPTION OF THE ILLUSTRATED EMBODIMENTS

According to embodiments of the invention, solid-oxide electrolysis cells may be used to convert steam and carbon dioxide ($CO_2$) into hydrogen ($H_2$) and carbon monoxide (CO). The solid-oxide electrolysis cells may be operated at high temperatures, such as between about 500° C. and about 1200° C. According to some embodiments of the invention, one or more solid-oxide electrolysis cells or one or more arrays of solid-oxide electrolysis cells may utilize steam, heat, electricity, or other products produced as the result of a nuclear reaction, such as the products produced by a nuclear power facility, to produce the syngas components hydrogen and carbon monoxide. The combination of one or more solid-oxide electrolysis cells or arrays with a nuclear power facility may provide a clean alternative for producing syngas and synfuels from readily available sources of carbon dioxide and steam.

According to particular embodiments of the invention, one or more solid-oxide electrolysis cells may be used to convert carbon dioxide ($CO_2$) and steam ($H_2O$) into syngas, or carbon monoxide (CO) and hydrogen ($H_2$). The one or more solid-oxide electrolysis cells may be packed together or otherwise arranged to form a solid-oxide electrolysis cell array configured for handling desired flow rates and production rates of syngas from available carbon dioxide and steam sources. One or more solid-oxide electrolysis arrays may be combined to increase syngas production capabilities achievable with embodiments of the invention.

Figure 1:
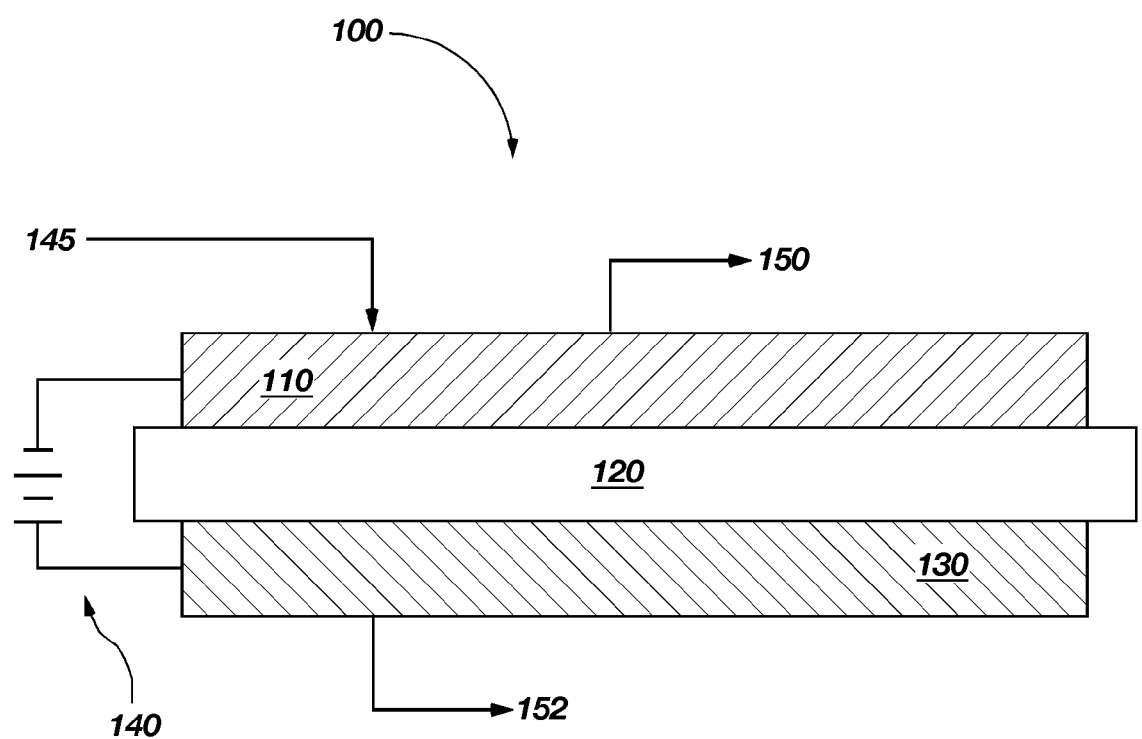
FIG. 1 illustrates a diagram of a single solid-oxide electrolysis cell that may be used according to embodiments of the invention.

A simplified diagram of a single solid-oxide electrolysis cell 100 that may be used with particular embodiments of the invention is illustrated in FIG. 1. The solid-oxide electrolysis cell 100 may include a cathode 110, an anode 130, and an electrolyte 120 sandwiched or otherwise positioned between the cathode 110 and anode 130. The cathode 110 and anode 130 may be connected to a power source 140 suitable for providing an electrical current to the solid-oxide electrolysis cell 100.

According to embodiments of the invention, carbon dioxide ($CO_2$) and steam ($H_2O$) introduced on the cathode 110 side of the solid-oxide electrolysis cell 100 as feed stream 145 may undergo electrolysis, whereby oxygen ($O_2$) is removed from the carbon dioxide and steam, forming two product streams: a first product stream 150 of carbon monoxide and hydrogen and a second product stream 152 of oxygen. The second product stream 152 of oxygen may pass through the solid-oxide electrolysis cell 100, exiting the anode 130 of the solid-oxide electrolysis cell 100 as illustrated in FIG. 1. The first product stream 150 may comprise components of syngas—carbon monoxide and hydrogen—which may be fed to a synfuels production process or may be stored as syngas. Water ($H_2O$), or steam, as well as carbon dioxide ($CO_2$), which is not decomposed on the cathode 110 side of the solid-oxide electrolysis cell 110, may also be removed with the first product stream 150.

For example, steam and carbon dioxide may be introduced on the cathode 110 side of the solid-oxide electrolysis cell 100 by feed stream 145. The steam, or water, decomposes in the presence of electrons supplied to the cathode 110 by the power source 140 according to Reaction (1):

$$2H_2O + 4e^- \rightarrow 2H_2 + 2O^{-2} \qquad (1).$$

The decomposition of water in the cathode produces hydrogen ($H_2$) and oxygen ions ($O^{-2}$). The oxygen ions may pass through the electrolyte 120 to the anode 130, where the oxygen ions give up electrons, forming oxygen ($O_2$) that is collected as the second product stream 152. Hydrogen formed by the decomposition of water in the cathode 110 may not pass through the electrolyte 120 and may be collected as part of the first product stream 150.

Carbon dioxide ($CO_2$) introduced on the cathode 110 side of the solid-oxide electrolysis cell 100 may undergo a similar electrolytic reaction as the steam in Reaction (1), wherein the carbon dioxide decomposes in the presence of electrons supplied to the cathode 110 by the power source 140 according to Reaction (2a):

$$2CO_2 + 4e^- \rightarrow 2CO + 2O^{-2} \qquad (2a).$$

The carbon dioxide introduced to the cathode 110 may also react with the hydrogen produced in the solid-oxide electrolysis cell 100 to form carbon monoxide (CO) and water, for example, according to Reaction (2b):

$$CO_2 + H_2 \rightarrow CO + H_2O \qquad (2b).$$

The carbon monoxide may be collected with the hydrogen as part of the first product stream 150. The water by-product of the reaction of carbon dioxide with hydrogen may be decomposed according to Reaction (1) or portions of the water may be carried away in the first product stream 150. The hydrogen and carbon monoxide collected in the first product stream 150 may be used as syngas.

The electrolysis and conversion of carbon dioxide and steam into carbon monoxide and hydrogen according to embodiments of the invention may be performed at temperatures between about 500° C. and about 1200° C. In some particular embodiments, the electrolysis and conversion of carbon dioxide and steam into syngas components using solid-oxide electrolysis cells may be performed at a temperature between about 800° C. and 1000° C. Thus, embodiments of the invention include high-temperature electrolysis of carbon dioxide and steam to form syngas at or above about 500° C.

According to some embodiments of the invention, the feed stream 145 may be heated to provide the components of the feed stream 145 to the solid-oxide electrolysis cell 100 at a desired temperature, such as above about 500° C. Similarly, the first product stream 150 and the second product stream 152 may be heated to ensure that the products produced by the solid-oxide electrolysis cells 100 are maintained at a desired temperature. The feed stream 145 and product streams may be heated using conventional techniques. For example, a feed stream 145 flowing through a pipe to the solid-oxide electrolysis cell 100 may be heated to a desired temperature by electrical heat tape wrapped around the pipe or by exposing the pipe to steam. In other embodiments, the feed stream 145 may be heated to a desired temperature by a conventional heat exchanger, such as by a heat exchanger recuperator system.

The cathodes 110 of solid-oxide electrolysis cells 100 according to embodiments of the invention may include cathode materials conventionally used with solid-oxide electrolysis cells 100. The cathodes 110 may be formed of porous materials. For example, a cathode 110 that may be used with particular embodiments of the invention may include a cathode 110 comprising nickel-zirconia cermet material. It is understood that the materials used to form cathode 110 according to embodiments of the invention may include any material suitable for forming a cathode 110 for a solid-oxide electrolysis cell 100.

Anodes 130 of solid-oxide electrolysis cells 100 according to embodiments of the invention may include anode materials conventionally used with solid-oxide electrolysis cells 100. The anodes 130 may be formed of porous materials. For example, anodes 130 that may be used with particular embodiments of the invention may include lanthanum strontium manganite or strontium doped lanthanum manganite materials. It is understood that the materials used to form anode 130 according to embodiments of the invention may include any material suitable for forming an anode 130 for a solid-oxide electrolysis cell 100.

The electrolytes 120 of solid-oxide electrolysis cells 100 according to embodiments of the invention may be formed of gas-tight electrolyte materials. For example, electrolytes 120 that may be used with embodiments of the invention may include, but are not limited to, an yttria stabilized zirconia electrolyte materials, scandia stabilized zirconia electrolyte materials, lanthanum gallate electrolyte materials (LSGM), ytterbium stabilized zirconia electrolye materials, and ceria ($CeO_2$) electrolyte materials. It is understood that the materials used to form the electrolytes 120 according to embodiments of the invention may include any material suitable for forming an electrolyte 120 layer between an anode 130 and cathode 110 of a solid-oxide electrolysis cell 100 or electrolysis cell.

Power sources 140 that may be used with embodiments of the invention may include any power source suitable for providing an electrical current through the solid-oxide electrolysis cell 100. For example, a power source 140 may include any direct current power source such as an electric outlet connected to a commercial power grid, a generator powered by gas, electricity, wind, water, steam, nuclear energy, solar energy, or other energy source, a battery or battery array, or any other conventional power source capable of supplying an electrical current to the solid-oxide electrolysis cell 100.

Figure 2:
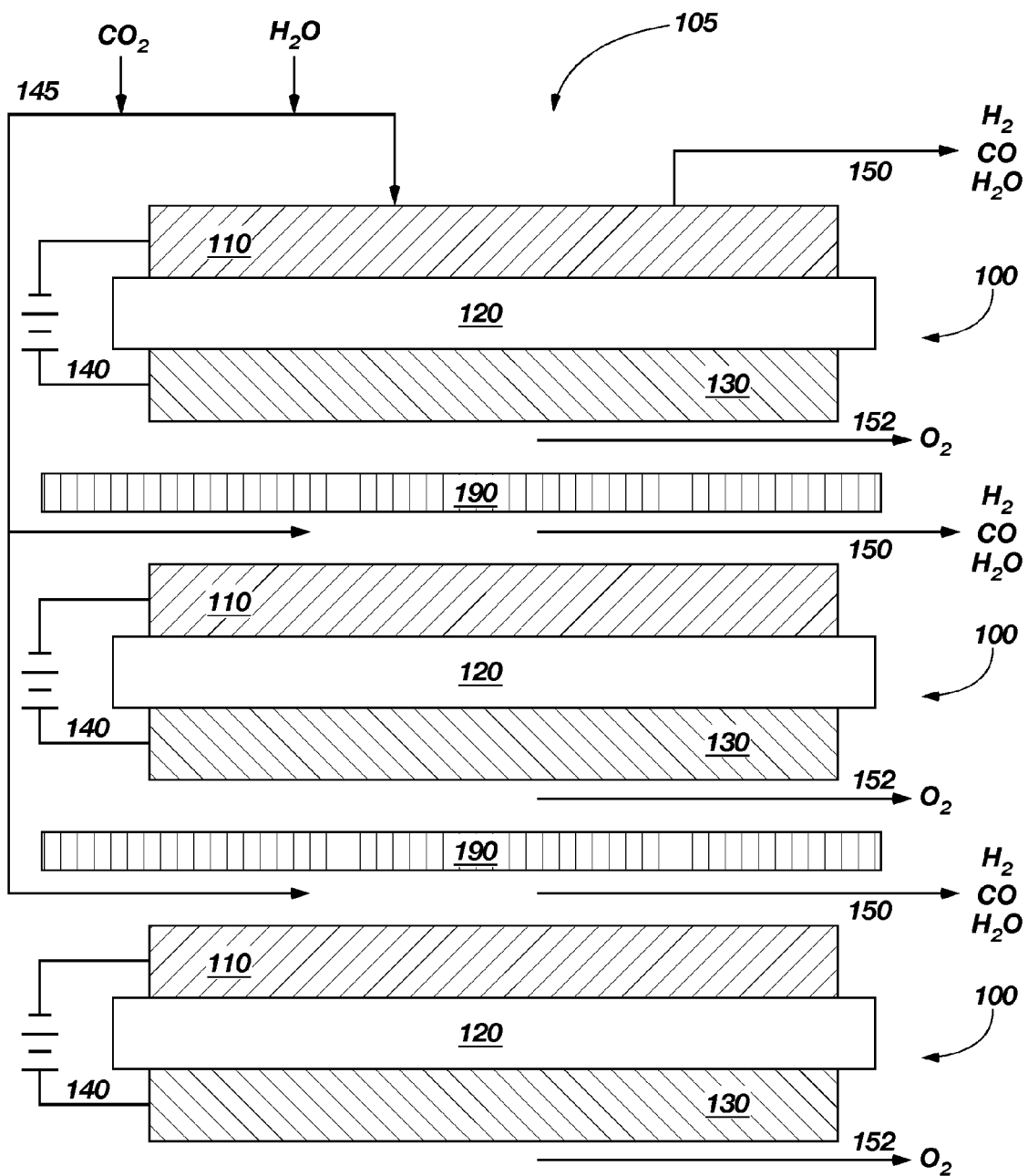
FIG. 2 illustrates an array of solid-oxide electrolysis cells according to embodiments of the invention.

According to other embodiments of the invention, one or more solid-oxide electrolysis cells 100 may be combined to form one or more arrays of solid-oxide electrolysis cells 105. For example, a representative example of an array of solid-oxide electrolysis cells 105 according to embodiments of the invention is illustrated in FIG. 2. Each of the solid-oxide electrolysis cells 100 illustrated in FIG. 2 may include a cathode 110, an anode 130, an electrolyte 120 sandwiched or otherwise positioned between the cathode 110 and anode 130, and a power source 140. In addition, the array of solid-oxide electrolysis cells 105 may include interconnections 190, which may separate each of the solid-oxide electrolysis cells 100 from the other solid-oxide electrolysis cells 100 in the array of solid-oxide electrolysis cells 105. The interconnections 190 may also serve to encase, or otherwise hold, the solid-oxide electrolysis cells 100 in an array configuration (not shown). While the array of solid-oxide electrolysis cells 105 illustrated in FIG. 2 includes only three solid-oxide electrolysis cells 100, it is understood that an array of solid-oxide electrolysis cells 105 may include as many or as few solid-oxide electrolysis cells 100 as desired. Furthermore, the solid-oxide electrolysis cells 100 used to form an array of solid-oxide electrolysis cells 105 may be configured in different shapes, sizes, or positions within the array of solid-oxide electrolysis cells 105. For example, an array of solid-oxide electrolysis cells 105 may include one or more solid-oxide electrolysis cells 100 arranged in a planar fashion, such as being stacked in a horizontal or vertical plate configuration. Alternatively, the array of solid-oxide electrolysis cells 105 may be configured in a tubular or circular fashion. Other array configurations may also be utilized according to embodiments of the invention and, as noted above, multiple arrays may be associated.

Feed stream 145 may feed water and carbon dioxide to each of the solid-oxide electrolysis cells 100 in the array of solid-oxide electrolysis cells 105. In other embodiments, one or more feed streams (not shown) may feed water, carbon dioxide, or water and carbon dioxide to one or more solid-oxide electrolysis cells 100 in an array of solid-oxide electrolysis cells 105. For instance, water could be fed to some, or all, of the solid-oxide electrolysis cells 100 in an array of solid-oxide electrolysis cells 105, allowing those solid-oxide electrolysis cells 100 receiving the water feed stream to decompose the water to hydrogen and oxygen. A carbon dioxide feed stream could similarly deliver carbon dioxide to some, or all, of the solid-oxide electrolysis cells 100 in an array of solid-oxide electrolysis cells 105. Various combinations of feed streams 145 may be employed with embodiments of the invention to customize the component feeds to an array of solid-oxide electrolysis cells 105 or to individual solid-oxide electrolysis cells 100.

The first product streams 150 from each of the solid-oxide electrolysis cells 100 in an array of solid-oxide electrolysis cells 105 may be collected individually or may be combined into a single first product stream 150. Similarly, the second product streams 152 from each of the solid-oxide electrolysis cells 100 in an array of solid-oxide electrolysis cells 105 may be collected individually or may be combined into a single second product stream 152.

The first product streams 150 and second product streams 152 may be collected from an array of solid-oxide electrolysis cells 105 in various manners. For example, an air stream, inert gas stream, steam stream, or other moving stream of gas or liquid may be directed into those spaces where the first product stream 150 is collected to mix with the desired product and carry it away. In some embodiments, for example, the products of the first product streams 150 may be collected by directing a stream of inert gas or other gas or fluid stream into the spaces between the cathodes 110, such as by directing a stream of steam across the cathode 110 side of the solid-oxide electrolysis cells 100. Alternatively, portions of the feed stream 145 may be used to carry away or collect the hydrogen and carbon monoxide in the first product stream 150, which is formed across the length of a cathode 110 of a solid-oxide electrolysis cell 100. For instance, a feed stream 145 of carbon dioxide and steam, or water, may be introduced at a first end of a solid-oxide electrolysis cell 100. As the feed stream 145 passes over the cathode 110 of the solid-oxide electrolysis cell 100 portions of the feed stream 145 enter the porous cathode 110 where the water is decomposed into hydrogen and oxygen ions. A portion of the hydrogen formed in the cathode 110 may react with the carbon dioxide, forming water and carbon monoxide. The remaining hydrogen and carbon monoxide may be collected in a portion of the feed stream 145 that continues to flow over the cathode 110. Some of the steam that is fed through feed stream 145 may not be decomposed and may flow over an entire length of a solid-oxide electrolysis cell 100, exiting the solid-oxide electrolysis cell 100 as part of first product stream 150, having mixed with hydrogen and carbon monoxide formed on the cathode 110 side of the solid-oxide electrolysis cell 100. The production of oxygen by the solid-oxide electrolysis cell 100 may produce a flow of oxygen from the anode 130 side of the solid-oxide electrolysis cell 100 sufficient to promote the flow of oxygen from the solid-oxide electrolysis cell 100.

According to particular embodiments of the invention, one or more solid-oxide electrolysis cells 100 or arrays of solid-oxide electrolysis cells 105 may be combined with or may utilize the resources of nuclear power. Electricity, heat, steam, or combinations thereof produced by nuclear power may be used with the solid-oxide electrolysis cells 100 to produce syngas according to embodiments of the invention. The use of electricity, heat, steam, or combinations thereof produced by nuclear power with embodiments of the invention may provide relatively clean energy and steam for the syngas production, thereby reducing pollutants. For example, nuclear power creates heat, which may be captured by producing steam from water using that heat. The steam produced by the heat of the nuclear reaction may be used with embodiments of the invention. Steam produced using conventional coal-fired processes results in the production of pollutants from the burning of the coal. However, nuclear power provides a relatively clean supply of steam because the only pollutants in the nuclear process may be the waste nuclear fuel, which is a negligible amount when compared to the amount of pollution created by the burning of coal. Likewise, the electricity and heat produced by nuclear power processes are relatively clean or pollutant free when compared to processes which combust coal, gas, or oil to generate electricity and heat. It may be advantageous, at least from an environmental standpoint, to utilize nuclear power and nuclear generated energy as a source for electricity, heat, steam, or combinations thereof as feed streams 145 and power sources 140 for solid-oxide electrolysis cells 100 according to embodiments of the invention.

For instance, one or more solid-oxide electrolysis cells 100 or arrays of solid-oxide electrolysis cells 105 may be located in proximity to a nuclear energy source or power plant such that steam, heat, and electricity generated by the nuclear power plant may be used with the processes according to embodiments of the invention. Steam from the nuclear power plant may be fed to feed stream 145 for a process according to embodiments of the invention. The steam from the nuclear power plant may be combined with a carbon dioxide source and fed to the one or more solid-oxide electrolysis cells 100 or arrays of solid-oxide electrolysis cells 105. Heat generated at the nuclear power plant may be used to heat the steam and carbon dioxide feed streams 145 to a temperature desired for syngas production according to embodiments of the invention, such as to a temperature between about 500° C. and about 1200° C. Electricity produced by the nuclear power plant may be used to provide a current to the one or more solid-oxide electrolysis cells 100. In this manner, a relatively clean source of energy, nuclear power, may be employed to produce syngas, which may be converted into relatively clean-burning synfuels. Combination of the use of nuclear energy produced steam, heat, and electricity to generate feed components and electricity to be used with solid-oxide electrolysis cells 100 according to embodiments of the invention may help to reduce the overall amount of pollutants produced per unit volume of syngas as compared to other processes where coal, gas, oil, or waste-fired boilers are used to produce steam, heat, and electricity.

Carbon dioxide for use with embodiments of the invention may be obtained from numerous sources. For example, carbon dioxide stored in a gas or liquid state may be included as a component of a feed stream 145 to a solid-oxide electrolysis cell 100 according to embodiments of the invention. Carbon dioxide produced as an off-gas, or waste gas, in a manufacturing process may also be used as a source of carbon dioxide according to embodiments of the invention. For instance, a cement clinker production process may produce a significant amount of carbon dioxide as waste gas. The carbon dioxide waste gas produced by the cement clinker production process may be fed to a syngas production process as a portion of a feed stream 145 according to embodiments of the invention. Other sources of carbon dioxide, such as from the combustion of coal, gas, oil, wastes, or other materials, or petrochemical refining processes, or biological reduction processes may also be used with embodiments of the present invention.

An electrical power plant that burns coal, gas, oil, or waste to produce electricity may serve as a source of carbon dioxide for a syngas production process according to embodiments of the invention. The electrical power plant may also provide electricity and heat, which may be used with a syngas production process. According to embodiments of the invention, one or more solid-oxide electrolysis cells 100 or arrays of solid-oxide electrolysis cells 105 may be fed carbon dioxide produced by an electrical power plant. Waste heat produced at the electrical power plant may also be used to heat the carbon dioxide streams or steam and carbon dioxide streams to provide a feed stream 145 to a syngas production process according to embodiments of the invention. Similarly, electricity produced by the electrical power plant may be used in a syngas production process to provide an electrical current to the one or more solid-oxide electrolysis cells 100 being used to produce syngas. Electricity produced by the electrical power plant may also be used to generate steam or other necessary components for a syngas production process.

According to embodiments of the invention, a process for producing hydrogen and carbon monoxide includes providing nuclear power and utilizing one or more solid-oxide electrolysis cells 100 or solid oxide fuel cell arrays 105 with the nuclear power to generate hydrogen, carbon monoxide, or hydrogen and carbon monoxide for syngas and synfuels. For example, a block diagram of a process according to particular embodiments of the invention is illustrated in FIG. 3.

Figure 3:
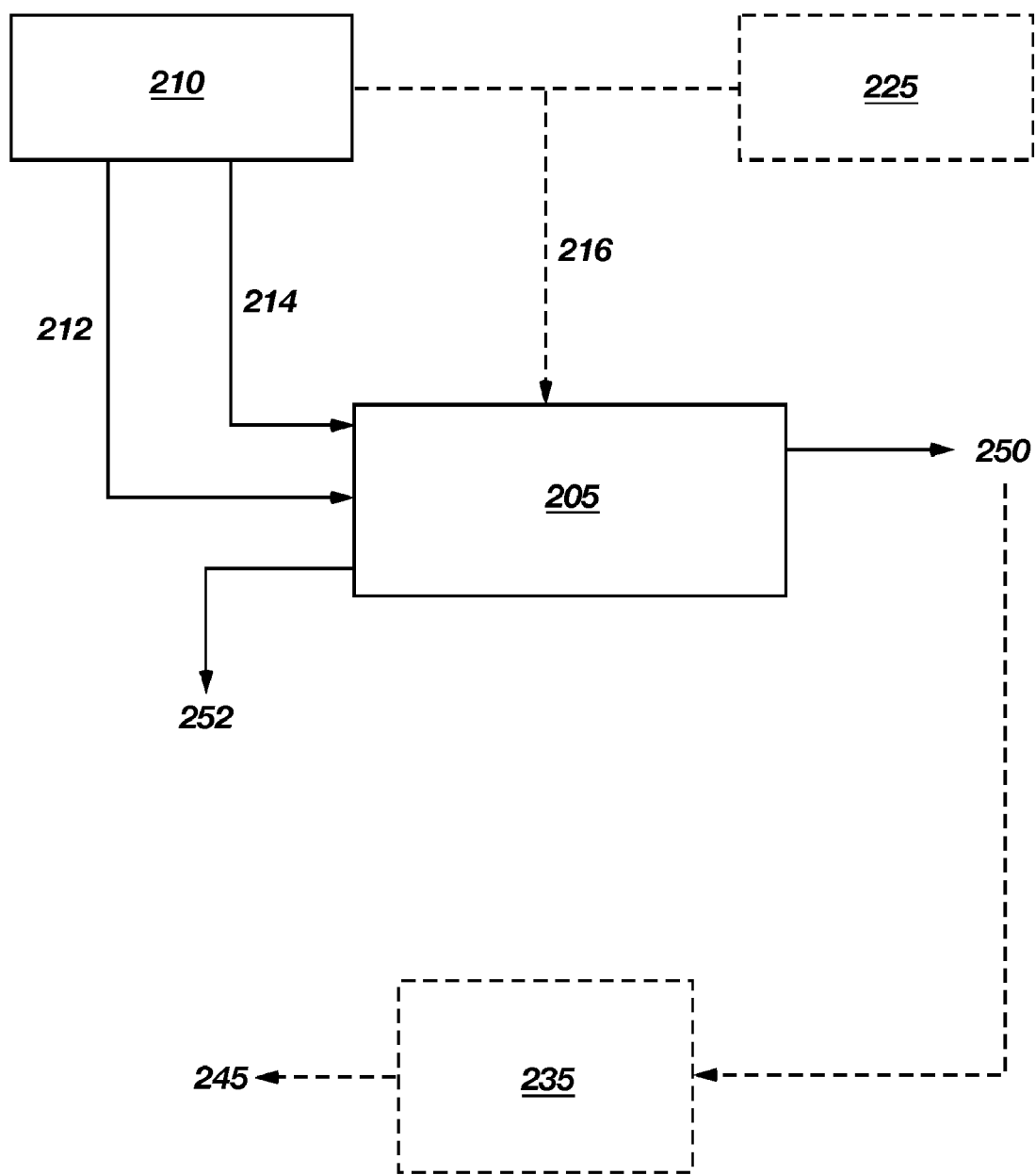
FIG. 3 illustrates a block diagram of a process flow system according to embodiments of the invention.

In a process for producing syngas components from steam and carbon dioxide as depicted in FIG. 3, a nuclear power source 210 may provide one or more components necessary for the formation of syngas from steam and carbon dioxide. One or more arrays of solid-oxide electrolysis cells 205 associated with the nuclear power source 210 may receive any combination of steam, water, heat, electricity, or carbon dioxide from the nuclear power source 210. For example, the nuclear power source 210 may provide a steam feed stream 212, an electrical feed stream 214, and components for producing a carbon dioxide feed stream 216 to the one or more arrays of solid-oxide electrolysis cells 205. The carbon dioxide feed stream 216 may alternatively be provided by a carbon dioxide source 225 or from a combination of a nuclear power source 210 and a carbon dioxide source 225 as illustrated by the dashed line representing the carbon dioxide feed stream 216 and carbon dioxide source 225 in FIG. 3. Steam, or water, and carbon dioxide fed to the one or more arrays of solid-oxide electrolysis cells 205 may be decomposed, reacted, or converted to oxygen, hydrogen, and carbon monoxide according to embodiments of the invention. Oxygen may be removed from the one or more arrays of solid-oxide electrolysis cells 205 as second product stream 252 and syngas components hydrogen and carbon monoxide may be removed from the one or more arrays of solid-oxide electrolysis cells 205 as first product stream 250. All of, or portions of, the first product stream 250 may be routed to a synfuels production process 235 as illustrated by the dashed line representing the portion of the first product stream 250, directed to the synfuels production process 235 in FIG. 3. Alternatively, portions of, or the entire first product stream 250 may be stored, transported, or otherwise prepared to be used with a synfuels production process 235. Synfuels produced by a synfuels production process 235 may be collected as a synfuels product stream 245.

The nuclear power source 210 may include a nuclear power facility, a nuclear power plant, a portable nuclear power source, a nuclear-powered battery or battery array, or other nuclear powered device or process capable of producing steam, electricity, heat, carbon dioxide, or a mixture thereof for a syngas production process.

Steam produced by a nuclear power source 210 may be fed to one or more arrays of solid-oxide electrolysis cells 205 to be used as a source of water (in the form of steam) for a syngas production process. The steam produced by a nuclear power source 210 and delivered to one or more arrays of solid-oxide electrolysis cells 205 by steam feed stream 212 may also be used as a source of heat to heat feed streams fed to the one or more arrays of solid-oxide electrolysis cells 205, to heat individual or groups of the solid-oxide electrolysis cells, or to heat the product streams from the one or more solid-oxide electrolysis cells in the arrays of solid-oxide electrolysis cells 205.

Electricity produced by a nuclear power source 210 may be used to drive a current across the solid-oxide electrolysis cells of the one or more solid-oxide electrolysis cell arrays 205.

A carbon dioxide feed stream 216 may be produced from products of a nuclear power source 210, for example, by processes utilizing heat generated from the nuclear power source 210 to combust materials, which combustion produces carbon dioxide. Alternatively, a carbon dioxide feed stream 216 may be provided by a carbon dioxide source 225. A carbon dioxide source 225 may include, but is not limited to, a carbon dioxide storage apparatus that may store liquid carbon dioxide, solid carbon dioxide, gaseous carbon dioxide, or a combination thereof. A carbon dioxide source 225 may also include a process that produces carbon dioxide, such as a combustion process. For example, processes that may produce carbon dioxide include processes involving the combustion of fuels, the combustion of waste materials, and the production of cement clinker. Carbon dioxide from such processes, or other sources, may be used as a carbon dioxide feed stream 216 with embodiments of the invention.

EXAMPLE

A high-temperature electrolysis process according to embodiments of the invention was performed to establish the feasibility of the inventive processes of embodiments of the invention. A graph of data illustrating relative input and output concentrations of water or steam ($H_2O$), carbon dioxide ($CO_2$), hydrogen ($H_2$), and carbon monoxide (CO) based upon the current (amps) supplied to a solid-oxide electrolysis cell according to embodiments of the invention are illustrated in FIG. 4.

A solid-oxide electrolysis cell according to embodiments of the invention, having a Nickel-Zirconia cermet material cathode, an Yttria stabilized Zirconia material electrolyte, and a Strontium-doped Lanthanum Manganite material anode, was operated at a temperature of about 800° C. An inlet stream comprising steam, hydrogen, carbon dioxide, and nitrogen was introduced to the cathode side of a solid-oxide electrolysis cell according to embodiments of the invention. The inlet hydrogen was used to maintain reducing conditions on the solid-oxide electrolysis cell cathode surface. The inlet nitrogen operated as an inert carrier gas for the steam being introduced to the solid-oxide electrolysis cell. The steam and carbon dioxide inlet streams were heated to about 800° C. and combined with the hydrogen and nitrogen gas. The outlet stream from the solid-oxide electrolysis cell was analyzed as a current was applied to the solid-oxide electrolysis cell and as the current was increased. The data obtained are plotted in FIG. 4.

At zero electrolysis current (i.e., the intersection of the x-axis and the y-axis in FIG. 4), a reverse shift reaction occurred across the solid-oxide electrolysis cell. As the current applied to the solid-oxide electrolysis cell was increased, the concentrations of the desired syngas components increased.

Figure 4:
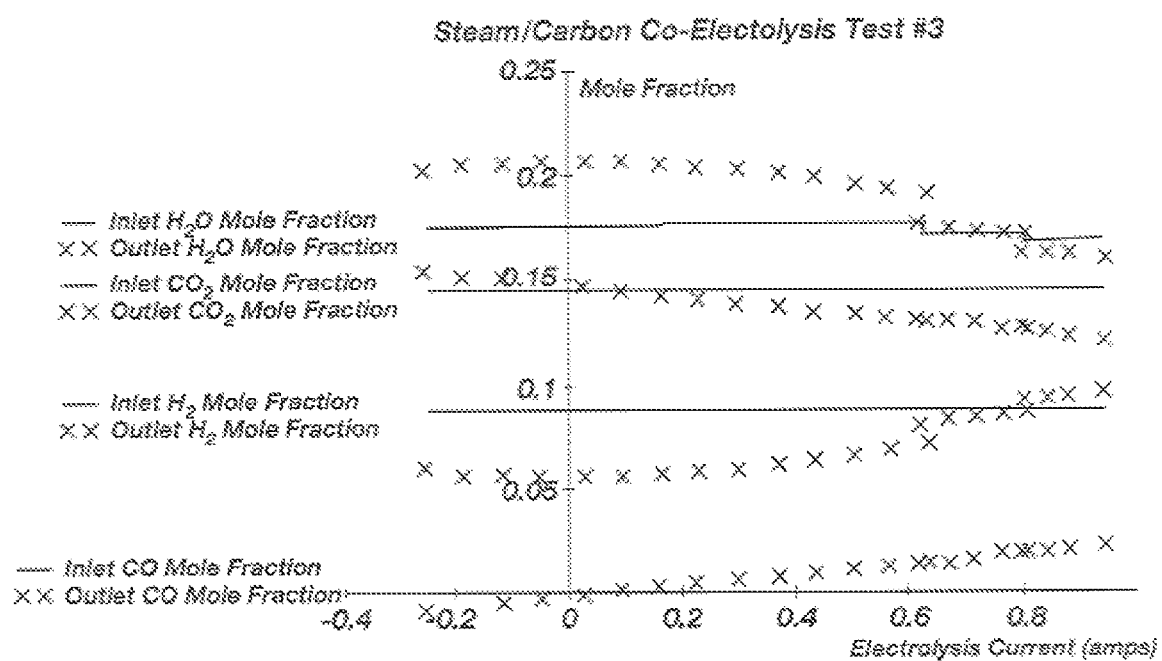
FIG. 4 illustrates a plot of concentration data for input and output streams of an exemplary solid-oxide electrolysis cell according to embodiments of the invention wherein the mole fraction concentration is plotted against the number of amps applied to the solid-oxide electrolysis cell.

The data in FIG. 4 indicate that steam and carbon dioxide may be converted to carbon monoxide and hydrogen through electrolysis performed by a solid-oxide electrolysis cell according to embodiments of the invention. The data also indicate that as the current applied to a solid-oxide electrolysis cell is increased, the mole fraction of the converted steam and carbon dioxide to carbon monoxide and hydrogen also increases. Thus, the conversion of steam and carbon dioxide to carbon monoxide and hydrogen using solid-oxide electrolysis cells is feasible.

In addition, the data indicate that, for at least this example, the conversion of steam and carbon dioxide to carbon monoxide and hydrogen produced a ratio of hydrogen to carbon dioxide of about 2 to 1, respectively, which is appropriate for Fisher-Tropsch conversion of syngas (carbon monoxide and hydrogen) to synfuels.

Accordingly, embodiments of the invention may be used to convert steam and carbon dioxide to syngas, or carbon monoxide and hydrogen, in sufficient quantities for the production of synfuels from the outlet streams of the solid-oxide electrolysis cells.

Having thus described certain embodiments of the present invention, it is understood that the invention defined by the appended claims is not to be limited by particular details set forth in the above description, as many apparent variations thereof are contemplated without departing from the spirit or scope thereof as hereinafter claimed.

What is claimed is:

1. A method for producing at least one syngas component, comprising:
    directly exposing water and carbon dioxide to heat generated by a nuclear power source to produce a feed stream comprising steam and the carbon dioxide;
    combining the feed stream with nitrogen and hydrogen to produce an inlet stream comprising the steam, the carbon dioxide, the hydrogen., and the nitrogen:
    introducing the inlet stream to a cathode side of at least one solid-oxide electrolysis cell;
    supplying an electrical current produced by the nuclear power source to the at least one solid-oxide electrolysis cell to decompose the steam and the carbon dioxide of the inlet steam with the at least one solid-oxide electrolysis cell to produce hydrogen and carbon monoxide; and
    selecting a magnitude of the electrical current supplied to the at least one solid-oxide electrolysis cell to produce the hydrogen and the carbon monoxide at a ratio of about 2 to 1.

2. The method of claim 1, further comprising selecting the nuclear power source from the group consisting of a nuclear power plant, a nuclear power facility, a nuclear battery, and a portable nuclear power source.

3. The method of claim 1, wherein introducing the inlet stream to a cathode side of at least one solid-oxide electrolysis cell comprises introducing the inlet stream to cathode sides of at least one array of solid-oxide electrolysis cells located in proximity to the nuclear power source.

4. The method of claim 1, further comprising configuring the at least one solid-oxide electrolysis cell to comprise:
    a cathode;
    an anode; and
    an electrolyte positioned between the cathode and anode.

5. The method of claim 4, further comprising selecting a nickel-zirconia cermet material to comprise the cathode.

6. The method of claim 4, further comprising selecting a strontium doped lanthanum manganite material to comprise the anode.

7. The method of claim 4, further comprising selecting yttria stabilized zirconia material to comprise the electrolyte.

8. The method of claim 1, further comprising increasing the electrical current to increase a concentration of the hydrogen and the carbon monoxide produced by the at least one solid-oxide electrolysis cell.

9. The method of claim 8, wherein increasing the electrical current comprises increasing the electrical current to greater than about 2 amps.

10. The method of claim 1, further comprising routing the hydrogen and the carbon monoxide to a synfuel production process.

11. The method of claim 1, further comprising reacting at least a portion of the hydrogen with the carbon dioxide to produce carbon monoxide.

12. The method of claim 1, further comprising producing the carbon dioxide by combusting materials using the heat generated by the nuclear power source.

13. The method of claim 11, further comprising collecting the carbon monoxide.

14. The method of claim 1, further comprising producing the carbon dioxide as an off-gas or waste gas in a manufacturing process.

15. The method of claim 1, wherein directly exposing water and carbon dioxide to heat generated by a nuclear power source to produce a feed stream comprises directly exposing water and carbon dioxide to heat generated by a nuclear power source to produce a feed stream having a temperature of between about 800° C. and about 1000° C.

16. A process for producing hydrogen and carbon monoxide, comprising:
    directly exposing water and carbon dioxide to heat generated by a nuclear power source to produce a feed stream comprising steam and carbon dioxide;
    combining the feed stream with nitrogen and hydrogen to produce an inlet stream comprising the steam, the carbon dioxide, the hydrogen, and the nitrogen;
    introducing the inlet stream to a cathode side of at least one solid-oxide electrolysis cell to decompose the steam into hydrogen and oxygen ions and the carbon dioxide of the inlet stream into carbon monoxide; and
    providing an electrical current produced by the nuclear power source to the at least one solid-oxide electrolysis cell; and
    selecting a magnitude of the electrical current provided to the at least one solid-oxide electrolysis cell to produce the hydrogen and the carbon monoxide at a ratio of about 2 to 1.

17. The process of claim 16, wherein directly exposing the water and carbon dioxide to heat generated by a nuclear power source to create a feed stream comprises heating water and the carbon dioxide to produce a feed stream having a temperature of and having a temperature of between about 800° C. and about 1000° C.

18. The process of claim 16, further comprising combusting a fuel using the heat from the nuclear power source to produce the carbon dioxide.

19. The process of claim 16, further comprising providing a carbon dioxide source to supply the carbon dioxide, wherein the carbon dioxide source is selected from the group consisting of a combustion process, a cement clinker process, a petrochemical refining process and a carbon dioxide storage facility.

20. The method of claim 4, further comprising collecting oxygen from the anode.

21. The method of claim 16, further comprising increasing the electrical current provided. to the at least one solid-oxide electrolysis cell to increase a concentration of the hydrogen and the carbon monoxide produced by the at least one solid-oxide electrolysis cell.

22. The method of claim 1, further comprising exposing at least one of the hydrogen and the carbon monoxide to heat from the nuclear power source.

* * * * *

UNITED STATES PATENT AND TRADEMARK OFFICE
CERTIFICATE OF CORRECTION

| | | |
|---|---|---|
| PATENT NO. | : 7,951,283 B2 | Page 1 of 2 |
| APPLICATION NO. | : 11/461337 | |
| DATED | : May 31, 2011 | |
| INVENTOR(S) | : Carl M. Stoots et al. | |

It is certified that error appears in the above-identified patent and that said Letters Patent is hereby corrected as shown below:

In the drawings:
Please replace FIG. 4 with the following amended Figure:

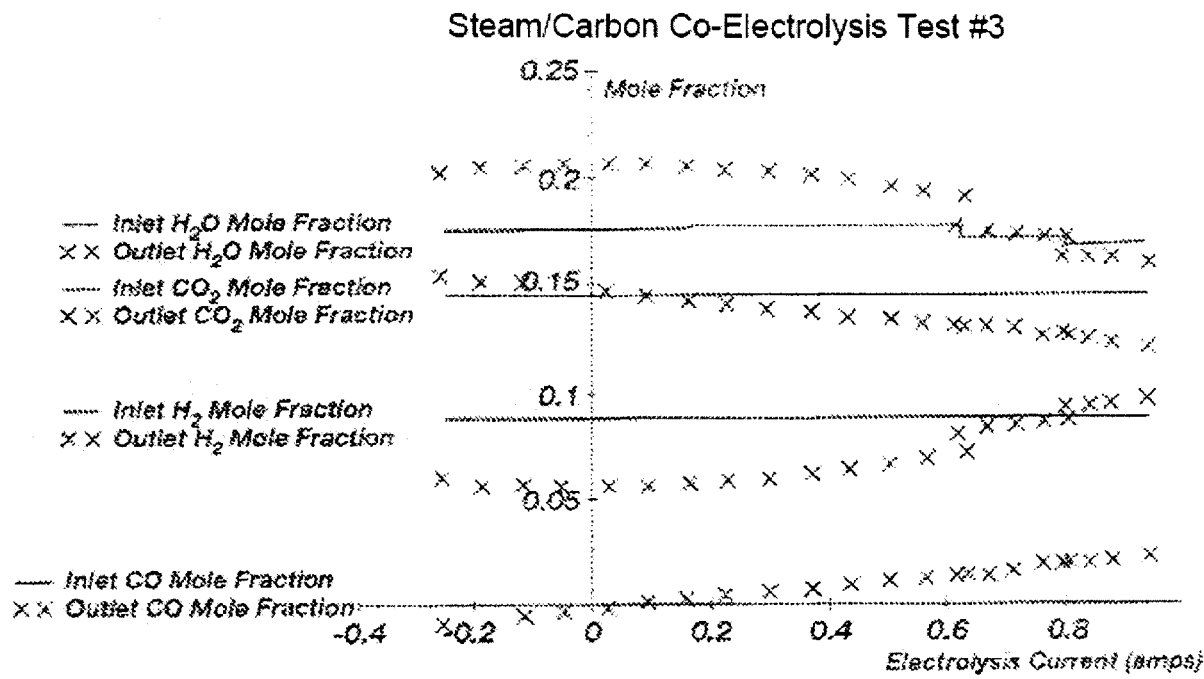

FIG. 4

Signed and Sealed this
Fifteenth Day of September, 2015

Michelle K. Lee
*Director of the United States Patent and Trademark Office*

CERTIFICATE OF CORRECTION (continued)
U.S. Pat. No. 7,951,283 B2

In the claims:

| | | | |
|---|---|---|---|
| CLAIM 1, | COLUMN 11, | LINE 24, | change "hydrogen., and the nitrogen:" to --hydrogen, and the nitrogen;-- |
| CLAIM 1, | COLUMN 11, | LINE 30, | change "steam" to --stream-- |
| CLAIM 21, | COLUMN 12, | LINE 56, | change "The method" to --The process-- |